June 10, 1952    H. P. WILSON    2,599,597
DOUBLE KNOTHEAD TWINER
Filed Nov. 14, 1949    7 Sheets-Sheet 1

INVENTOR.
HIRAM PRICE WILSON
BY
Emery Holcombe & Blair
ATTORNEYS

June 10, 1952

H. P. WILSON 2,599,597

DOUBLE KNOTHEAD TWINER

Filed Nov. 14, 1949

INVENTOR.
HIRAM PRICE WILSON

BY Emery Holcombe & Blair
ATTORNEYS

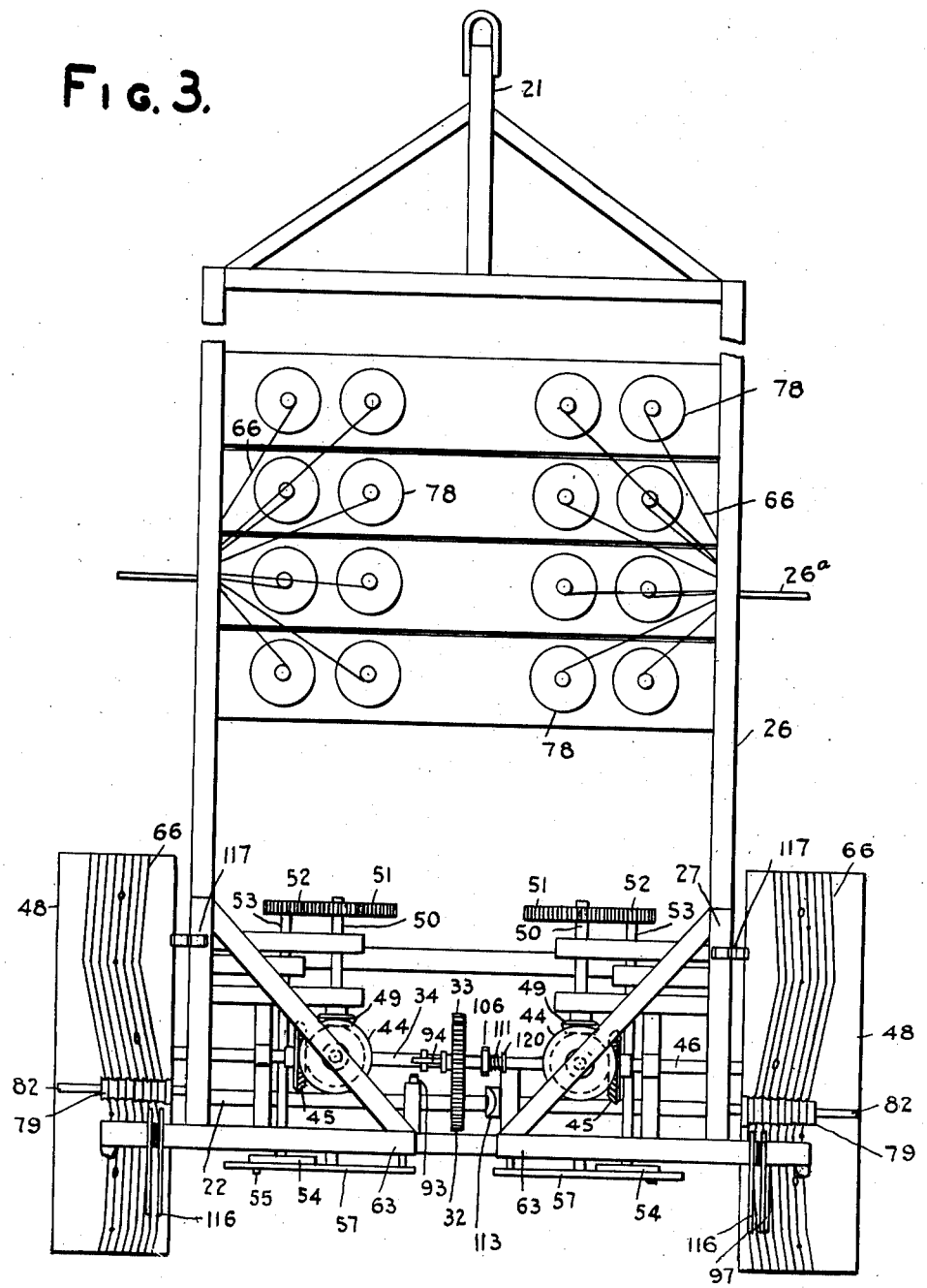

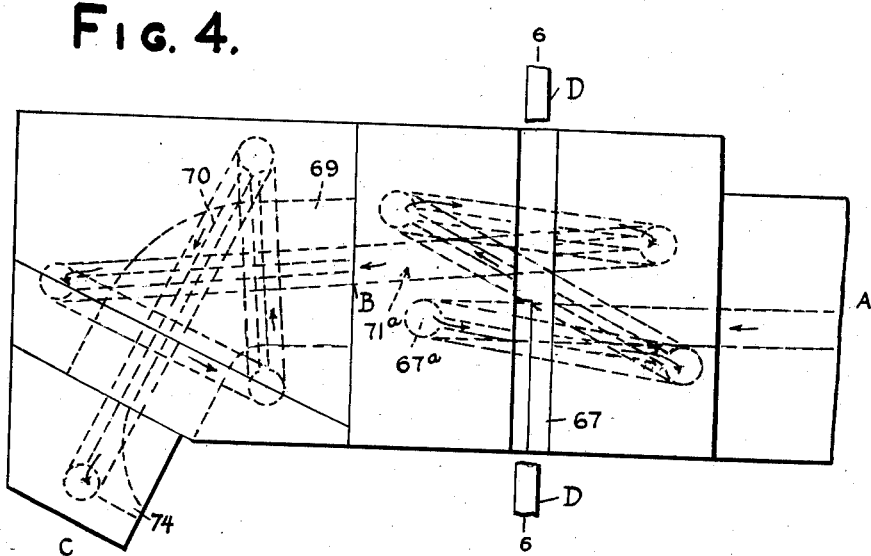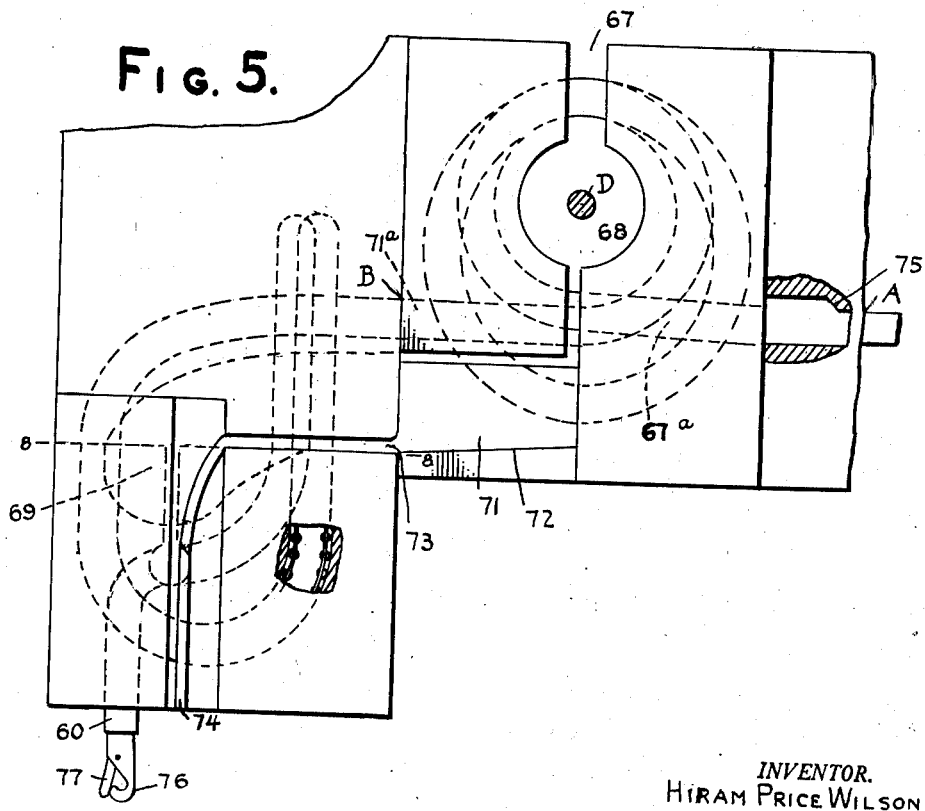

June 10, 1952 H. P. WILSON 2,599,597
DOUBLE KNOTHEAD TWINER
Filed Nov. 14, 1949 7 Sheets-Sheet 5

INVENTOR.
HIRAM PRICE WILSON
BY
Emery Holcombe + Blair
ATTORNEYS

June 10, 1952     H. P. WILSON     2,599,597
DOUBLE KNOTHEAD TWINER

Filed Nov. 14, 1949     7 Sheets-Sheet 6

INVENTOR.
HIRAM PRICE WILSON
BY
Emery Holcombe + Blair
ATTORNEYS

June 10, 1952
H. P. WILSON
2,599,597
DOUBLE KNOTHEAD TWINER
Filed Nov. 14, 1949
7 Sheets-Sheet 7
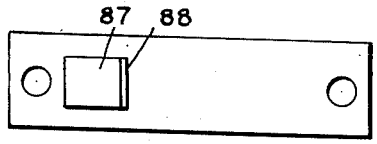
FIG. 16.
FIG. 14.
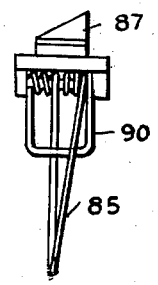
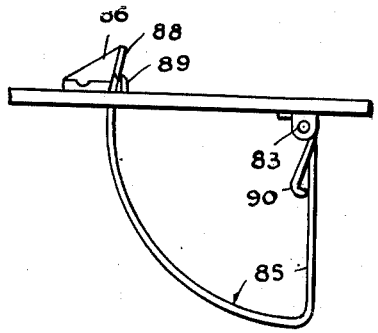
FIG. 15.
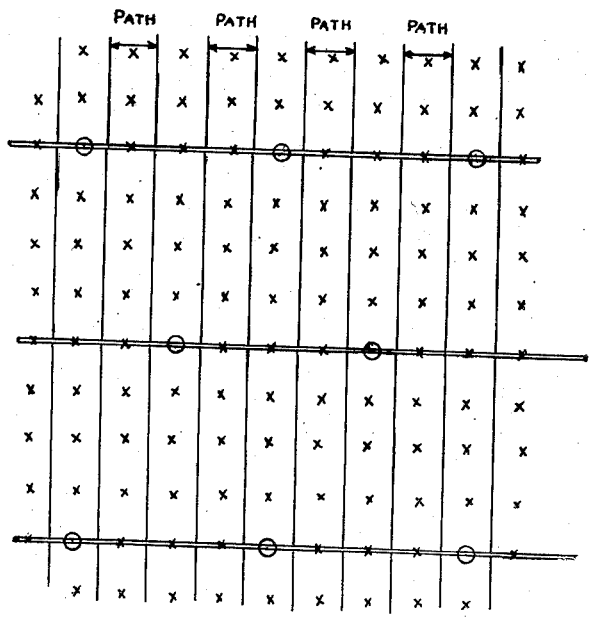
FIG. 17.
*INVENTOR.*
HIRAM PRICE WILSON
BY
*Emery Holcombe + Blair*
ATTORNEYS Patented June 10, 1952

2,599,597

UNITED STATES PATENT OFFICE 2,599,597

DOUBLE KNOTHEAD TWINER

Hiram Price Wilson, Mabton, Wash.

Application November 14, 1949, Serial No. 127,159

16 Claims. (Cl. 289—12)

Hops are perennial plants which grow well in the States of Washington and Oregon. Common growing procedures are used by most growers. The hops are set in hills forming long rows at right angles to each other, and the plants are seven feet apart. The rows are check planted to allow them to be plowed in two directions. Overhead wires run parallel to the rows and twines are suspended from these wires to support the plants.

There are two types of overhead wire, the light wires to which the twines are attached and the heavy cross wires which support the lighter ones. The heavy wires run in one direction along the field, directly above the hop plants, parallel to each other at 28 foot intervals, and are supported by poles which extend 16 feet above ground. These heavy cross wires support the light wires which extend at right angles to the heavy wires, and are spaced seven feet apart, one light wire passing midway between each two rows of hops. The general arrangement is shown in Figure 17 in which the X's indicate the hop plants, the heavy lines the heavy wires, the light lines the light wires, and the small circles the poles. While each heavy wire is supported by a pole at 28 foot intervals the poles supporting adjacent wires are staggered as shown in the figure, so as to leave an unobstructed pathway along one side of each light wire, and parallel thereto. From these light wires twines are suspended and tied to a stake driven near each hop plant. To each stake two twines are tied, one of which is attached to the nearest light wire on one side, and the other to the nearest light wire on the opposite side. In order for there to be two twines for each hop plant there must therefore be eight twines attached to each of the light wires between each pair of heavy wires.

Due to the breakage of the twine near the knot about the wire it is the usual practice to tie a large loop at one end of the twine with a overhand knot and use the two strands of the loop to tie a clove hitch about the wire. This method of looping the twine allows the hop and twine to remain in place even though one twine is broken near the knot. The twine is made of coir and the common practice among hop growers today is to spin the coir from the skeins of the baled coir and cut it into 18 or 19 foot lengths. Then by manual labor one end is doubled back and a simple loop knot tied with the two strands, making a loop on the end approximately forty inches in circumference. The twine is then tied in bundles of about 300 strings and stored until used.

When used the bundles are placed in troughs mounted near the platform on a sled or wagon. The individual lengths of twine are then picked up by the workmen and tied about the wire in the form of a clove hitch.

The purpose of my double-knot-head-twiner is to measure and cut a desired length of twine from a large supply, double back one end of the severed portion on itself, form a long loop near one end of this portion by tieing a simple overhand knot with the doubled strand, tie the doubled strand, tie the doubled strand of the loop about a wire in the form of a clove hitch, and leave the opposite end of the severed length of twine long enough to be tied to a stake near a hop plant.

My machine will thus tie a clove knot about any suitable support and leave each end of the twine in a desired length.

A major object of my double-knot-head-twiner is to save labor as it will replace two men under the present practice and do the work much faster. This will materially shorten the twining season in hop raising.

Another object of my double-knot-head-twiner is to use less twine in forming the loop and leave less extending beyond the clove knot than is necessary when the work is done by hand, which will result in a saving of twine.

An additional object of the double-knot-head-twiner is to lessen the danger to human lives, since in the present practice it is necessary for the men who tie the twine about the wire to ride on a high platform, approximately 12 feet high, some pulled by tractors and some by animals over rough ground.

A further purpose is to reduce the handling of hop twine since my machine will tie the two knots from a skein of baled coir or from a large supply spool of coir.

A still further purpose of my machine is to tie the twine about the wire without the need of soaking the twine in water as is the present practice.

The method used would also permit the tieing of other knots in a similar manner for other purposes, and the method by which my twiner ties the knots could also be used to tie the same knots about other objects by modifying the size of the knot heads and the length of the plunger.

My twiner is a simple device, having only a few moving parts, each of which may be easily and quickly replaced.

In my machine the twine is measured about a wheel whose circumference is the desired length. A plunger hook carried on the end of a flexible plunger is passed through a casting which has passages for the plunger in the form of the desired knots. The plunger hook picks up the twine a predetermined distance from the end and is retracted through the passages, laying the twine therein in the desired knot forms. The twine is then released from the passages through lateral slots in the casting and allowed to fall about itself in the simple loop form and about a wire which has been passed through the casting to form a clove knot. The hook releases the twine by means of a shearing blade which is part of the hook itself. My machine thus measures the twine, cuts it in desired lengths, forms a loop in one end thereof, ties a double strand of twine about the wire, and completely releases the twine from the mechanism, leaving it hanging freely from the wire so it may be tied to the stakes. My machine is of the tractor or horse drawn type and receives power from the traction of its wheels to motivate the necessry parts, but could be adapted to a power take off.

In the accompanying drawings which illustrate the embodiment of the invention:

Fig. 3 is a plan view;

Fig. 4 is a diagrammatic plan view of the knot tying elements;

Fig. 5 is a diagrammatic rear view of the overhand knot tyer, with fragmentary cross sections showing the bearing surfaces of the passages and the neck in the passage which trips the plunger blade;

Fig. 14 is an elevational view of the twine severing mechanism as seen from the right of Fig. 13 drawn to a larger scale;

Fig. 15 is an enlarged side elevation showing the twine severing mechanism;

Fig. 16 is a top plan view of the twine severing mechanism;

Fig. 17 shows schematically the usual layout of a hop field.

Like reference characters indicate like parts throughout the several views.

Figure 1:
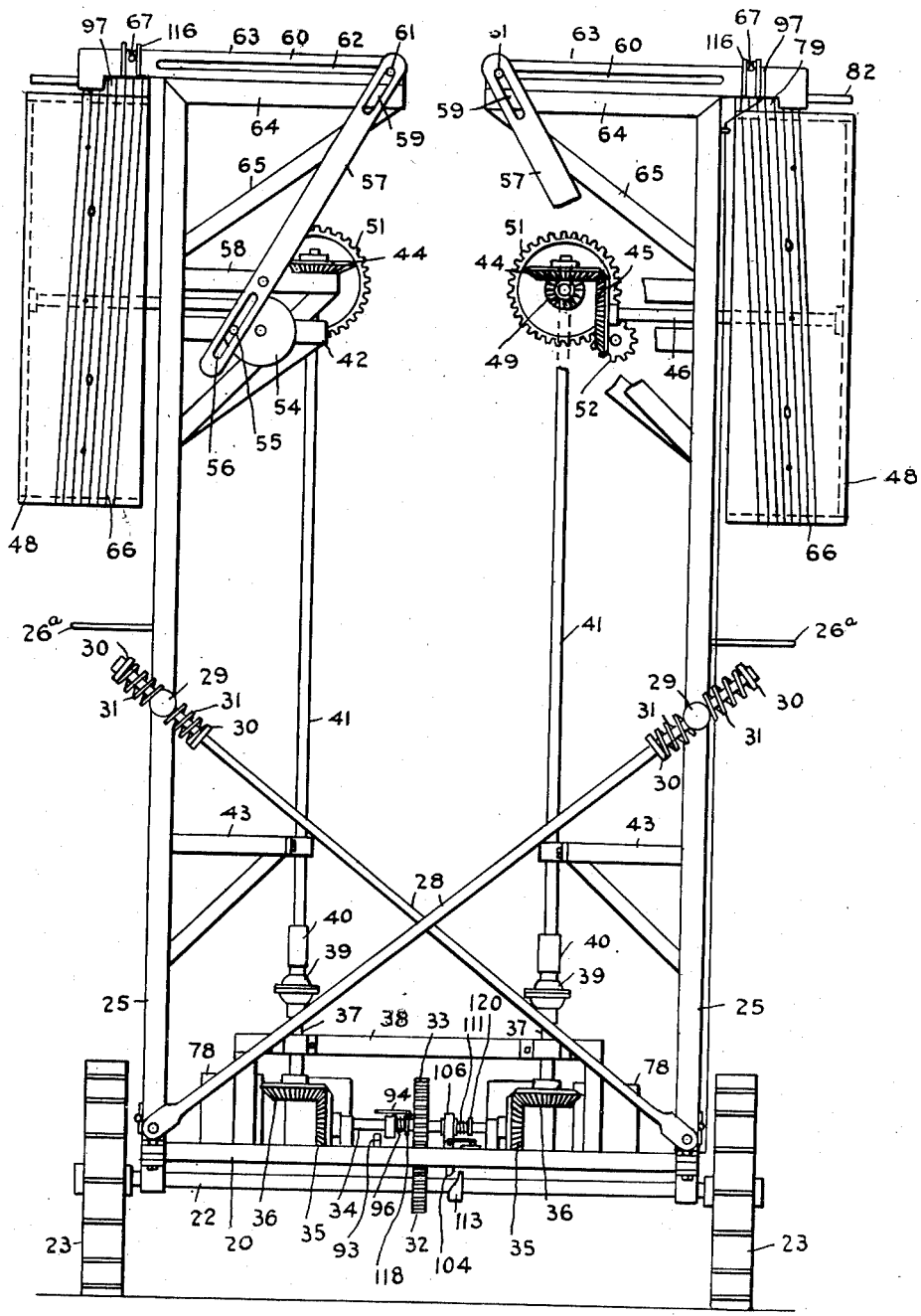
Fig. 1 is a rear elevation of my complete machine.
Figures 2, 18:
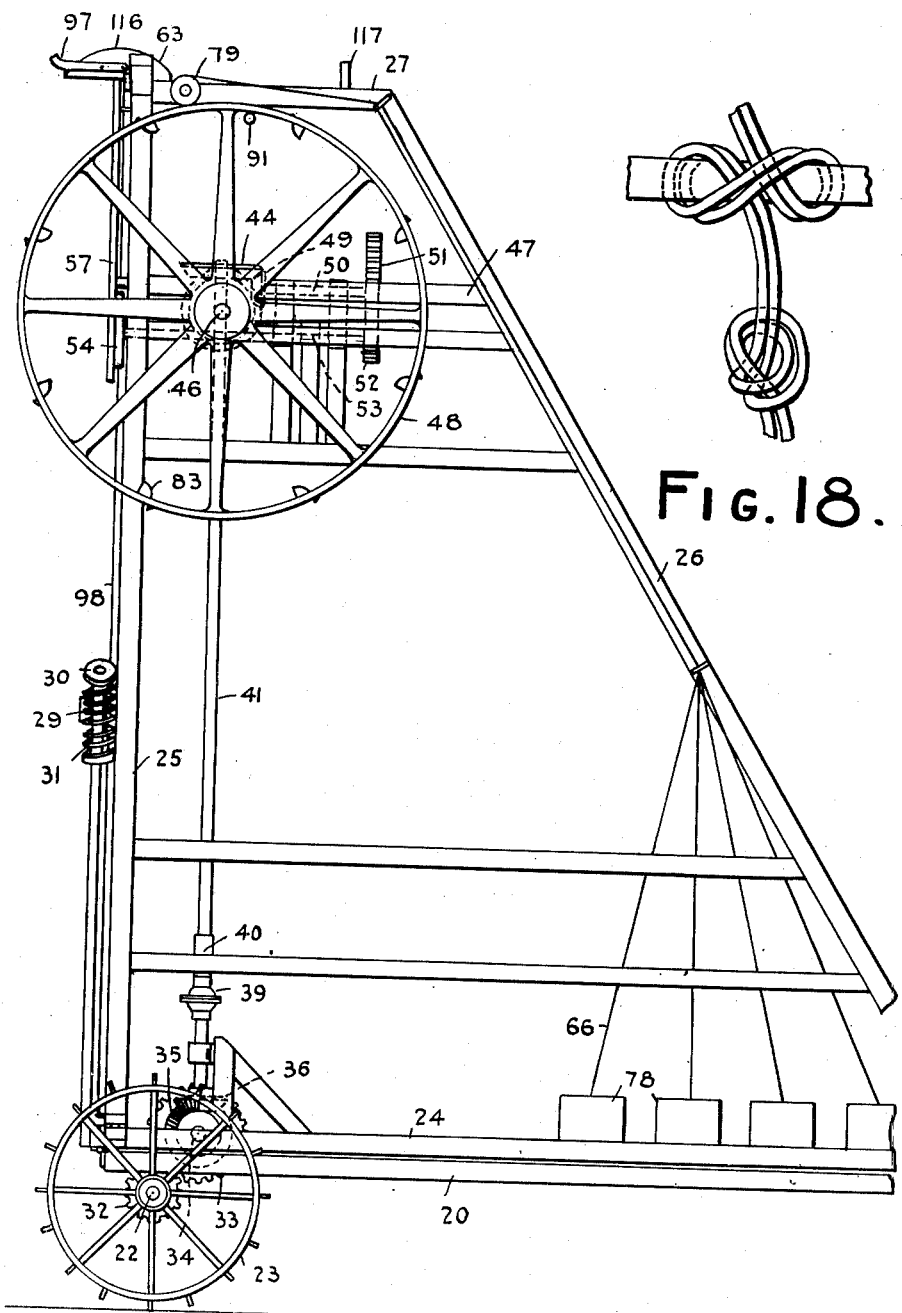
Fig. 2 is a side elevation, taken from the right.
Fig. 18 shows a clove hitch tied about a horizontal wire and secured by an overhand knot in the manner in which my machine will leave the twine attached to the wire.

As seen from Figures 1, 2 and 3, my twiner comprises a substantially rectangular base frame 20, carrying at its forward end hitching means 21 for attachment to a tractor or the like, and mounted at its rear end on an axle 22, supported by wheels 23, at least 6 but less than 7 feet in circumference. As will be seen later this permits 8 knots to be tied in approximately 25 of the 28 feet between crosswires or plants and the knot tying apparatus to idle for about 3 feet near the crosswires. Horizontal side members 24 overlie each side of the base frame 20, and are hinged to it at the rear so as to permit these side members, with the framework above them, to pivot about the rear of the machine in a vertical plane parallel to the direction in which the machine travels. An upright 25 is hinged to each side member 24 at its rear end so as to permit it to pivot about the side member in a vertical plane transverse to the direction of travel. Diagonal frame members 26 are attached to the front ends of the side members and each is connected at its upper end to the upper end of the upright 25 on the same side of the machine through a horizontal frame member 27. These diagonals 26 are also hinged to the side members for transverse pivoting, so that each complete side frame may sway transversely and both side frames together may pivot about the rear of the machine in a vertical plane. The swaying motion is limited by stabilizing rods 28, one of which is pivoted to the base of each upright 25, and crosses diagonally to the upright rising from the opposite corner. Each of these uprights 25 carries a flange 29 in which the diagonal stabilizing rod 28 is slidable, and the rod carries abutments 30 above and below the point at which it passes through the flange. Coil springs 31 encircle the rod between each abutment and the flange 29, thus normally retaining the uprights perpendicular to the ground but permitting a side sway under transverse pressure which is limited in degree by the location of the abutments.

Figure 6:
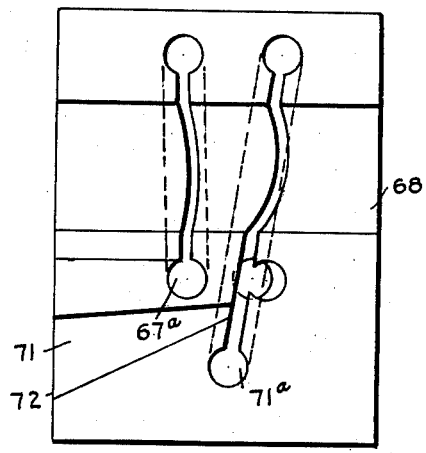
Fig. 6 is a cross section taken along the line 6—6 of Fig. 4 looking toward the left of that figure.
Figure 7:
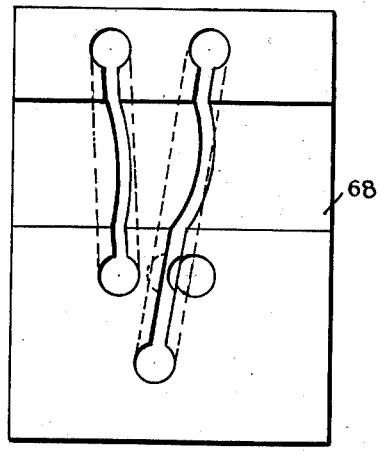
Fig. 7 is a cross section taken along the same line of the same figure, looking toward the right.
Figure 8:
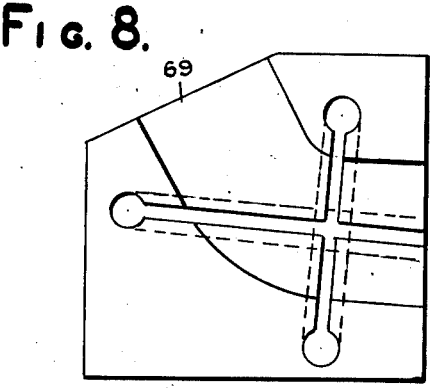
Fig. 8 is a partial cross section taken along the line 8—8 of Fig. 5, looking upward.
Figure 9:
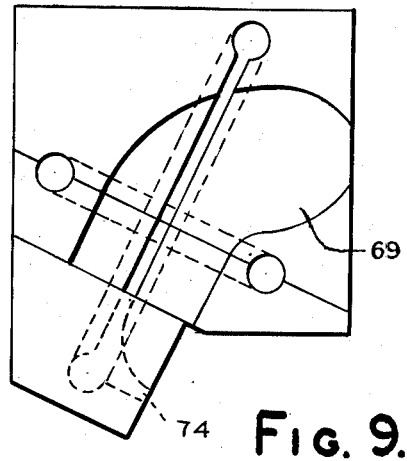
Fig. 9 is a cross section taken along the same line of the same figure looking down.
Figure 10:
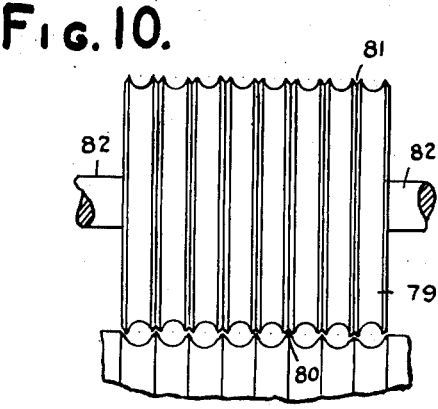
Fig. 10 is an enlarged detail view showing the guide pulley in elevation with a portion of the measuring drum from the rear thereof.
Figure 11:
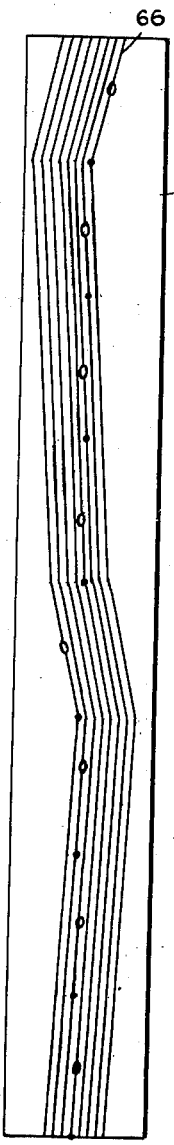
Fig. 11 is a development of the measuring drum.

A gear wheel 32 is mounted approximately midway of the axle 22, and meshes with a second gear wheel 33 slidably carried by a short axle 34 parallel to the first named axle 22 and rotatably mounted on the base frame 20. The diameter of the second gear is approximately 4 times that of the first in order to decrease the rotational speed of the second axle to one-fourth that of the first. This second or short axle 34 carries near each end a bevel gear 35, which meshes with a second bevel gear 36 carried by a short vertical rod 37. These short vertical rods are rotatably mounted in the horizontal bar 38, carried by the base frame 20 as shown in Figure 1, and are connected through universal joints 39 fixed through sleeves 40 to longer vertical rods 41, slidably mounted in these sleeves and held parallel to the side frames by upper and lower horizontal supports 42 and 43. Each of these longer vertical rods carries near its upper end a bevel gear 44 which meshes with a second bevel gear 45 of the same size mounted on the short horizontal shaft 46 which is supported from the side frame 25 by the horizontal members 47 best shown in Figure 2, and passes through the side frame to rotatably carry the measuring wheel 48. Each of the bevel gears 44 on the vertical rods 41 also meshes with a third bevel gear 49 approximately one-half of its size, carried on a short horizontal axle 50 parallel to and supported from the side frame. The axle 50 extends forwardly from this third bevel gear 49 and terminates in a plain gear 51 which meshes with a second plain gear 52 approximately one-fourth its size mounted on a second short axle 53 parallel to 50, and also supported from the side frame. This axle 53 extends rearwardly from the gear wheel 52 and terminates in a pitman 54 having a single pin 55. This pin is fitted into a slot 56 in the lever arm 57, which is pivotally mounted on the support 58, carried by the upright 25, extends upwardly and inwardly of the machine, and carries a second slot 59 near its upper end. It will be seen from the gear ratios set forth that this lever arm 57 will oscillate 8 times for each rotation of the measuring drum, or each 25 feet of travel by the machine. In the course of these oscillations it will reciprocate a flexible metallic plunger 60 (Figures 2 and 5) which it drives through a pin 61 (Fig. 1) seated in one end of plunger and extending through the slot 62. This plunger 60 is slidably mounted within the housing 63 which is supported on the cross-arm 64 attached to the upright 25 and braced by the diagonal 65. Reciprocation of the plunger drives it through curved passages (shown in Figs. 4-9) in the outer end of the housing 63 and down against the twines 66 carried on the measuring drum 48. Taking the left hand housing from the point of view of Fig. 1 after the light twine supporting wire has been slipped down through the slot 67 into channel 68, the plunger enters the innermost, or clove hitch tying set of passages at A of Figs. 4 and 5, and follows the arrowed line, leaving this set of passages at B. The plunger then enters the loop tying passages and emerges at C. The loop tying section of the housing is traversed by a large central knot outlet channel 69 the position of which is shown in Figs. 4, 5, 8 and 9. As the plunger is retracted, the twine is drawn in through C, and through the loop tying channel to B. As soon as the plunger is withdrawn from these channels the twine will slip out through the slots 70 intersecting the channels since these slots are wide enough to admit the twine, but too narrow for the plunger. An overhand knot will thus be formed in the knot channel 69 of the loop tying portion of the housing and drawn inward to B of Figs. 4 and 5. Since this knot is larger than the plunger, it will not enter the clove hitch passage beginning at B but will be diverted down the incline 71, leaving the housing at 72. (See Figs. 5 and 6.) The twine trailing behind the overhand knot will clear through the slots 73 and 74 of Figs. 4 and 5 which form a continuous opening with 71, terminating as the bottom of 67. Incline 71 leads from passage 71A to the edge of the block while 67 intersects only 67A. The plunger continues, leaving the clove hitch passage at A. Just before it reaches A there is a constriction 75 in the passage which compresses the head of the plunger. This head (best seen in Fig. 5) comprises a hook 76 and pivoted blade 77 normally closing the open side of the hook. The rear of the blade extends away from the hook, and when the head of the plunger is compressed this blade is forced inward towards the shank of the hook, thus cutting the twine held therein, leaving it free to cling to the light twine-supporting wire D and pass out through channels 68 and 71. The plunger is then driven back and the process repeated. It should be noted that the gearing and pitman are so arranged that the speed of the return stroke of the plunger into the housing is greater than that of the forward stroke. This reduces the time during which the twine is sliding along the wire as the clove knot is tied. The twine is coiled in boxes or on appropriate supply spools indicated at 78. There are eight of these twines for each measuring wheel, and they are led up the frame members 26 through guides 26A to an 8 channelled pulley wheel 79, over this pulley, and thence around each measuring drum 48 in a clockwise direction, reference being had to Figure 2. This measuring wheel carries 9 external ridges 80, the location of which is best shown in development in Figure 11. These ridges mesh with grooves 81 in the pulley wheel 79, as best shown in Fig. 10, the pulley wheel moves axially to accommodate itself to the ridges on the measuring wheel 28, since it is axially slidable on its supporting shaft 82, which is journalled in the cross member 27. At 8 equal intervals about the circumference of the measuring wheel its peripheral surface is cut away at the center to accommodate the plunger head, which is driven down so that the exterior of the hook 76 contacts the twine. The twine then slides along the exterior of the hook, forces back the pivoted blade 77 (which is rather blunt at its tip) and rides up into the curve of the hook, thus permitting the knife blade 77 to fall back in position, after which the plunger is withdrawn and the knots tied as outlined above. As will be best seen in Fig. 11, each of the eight points at which the measuring wheel 48 is cut away to accommodate the plunger head lies along the center of its surface. However, the grooves and ridges thereon are so arranged that a different twine is picked up at each of the eight points.

Figure 13:
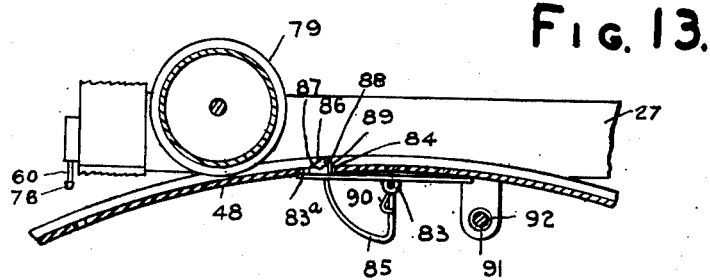
Fig. 13 is a detail view drawn to an enlarged scale showing the twine severing mechanism in vertical cross section.

As each measuring wheel 48 turns, the twine encounters the cutting assembly 83 best shown in Fig. 13. This is a separate part fixed to the inner surface of the wheel 48. The plate 83A is fixed to the inner surface of the measuring wheel and pivotally mounted lever arm 85 projects radially inward and then curves outwardly through a slot 84 in the plate and the surface of the wheel, terminating in a block 86, with an inclined outer surface 87. This block 86 carries a blade 88 mounted on its inner edge overhanging and parallel to the slot 84, and cooperates with a second blade 89 mounted on the plate 83A and projecting through the slot. The block 86 lies directly in the path of the twine and when it is raised by pivoting of the lever arm 85 the twine slides down the inclined surface 87 and slips under the block. A spring 90 normally retains the lever arm in a radial position, and the block flush against the plate 83A. However, a stop extends outwardly from the side frame 27 and comprises a horizontal axle 91 encircled by a freely rotatable sleeve 92. When this sleeve encounters the pivoted lever arm, the block is forced upward until the lever arm can pass over the stop. As the block is raised, the twine passes down the incline and into the slot formed between the lower edge of the block and the outer surface of the plate. The grooves in the wheel are so arranged that a different twine rests under the plunger each one-eighth revolution, and since there is only one stop, only the cutting mechanism holding this particular twine will be operated.

The axle 91 and sleeve 92 which serve as a stop to pivot the lever arm 85 are adjustably mounted on the side frame in order that their position may be shifted to synchronize the operation of the plunger and the clamping and cutting mechanism. The points at which the twines will be picked up are indicated by the dots and the relative positions of the cutters by the ovals in Fig. 11.

Figure 12:
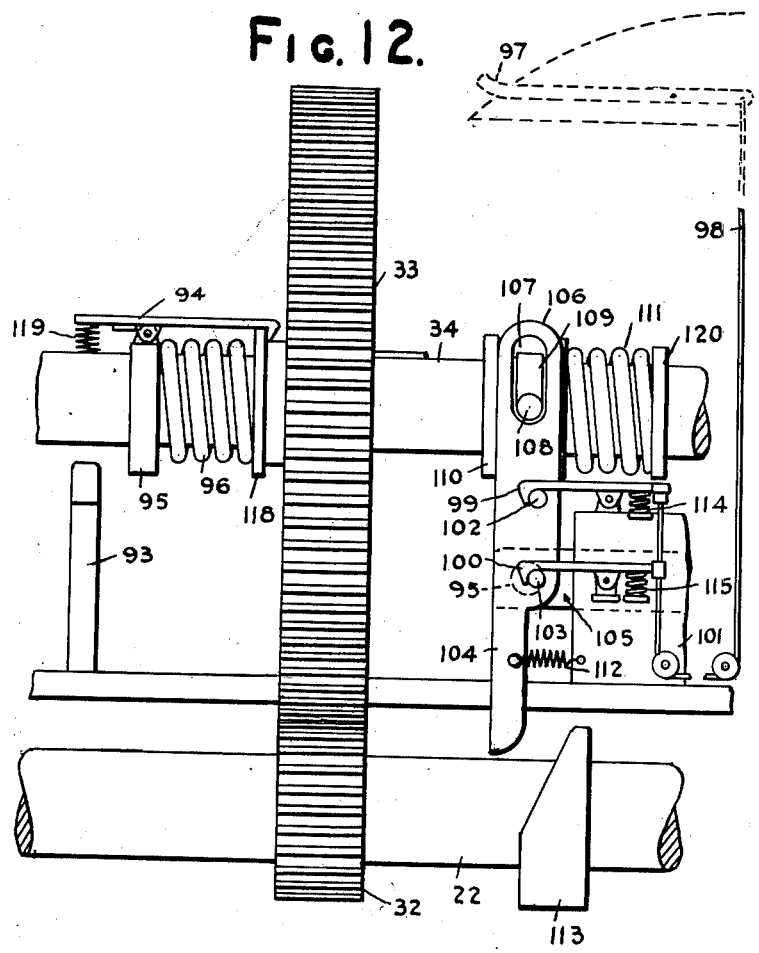
Fig. 12 is a detail view drawn to a larger scale showing the clutch mechanism in elevation as seen from the rear of the machine.

Referring now to the clutch mechanism, it will be observed from Figure 12, that stop 93 which is fixed to the base frame 20, will trip the lever arm 94 which is pivotally mounted on a collar 95 fixed to the axle 34, once for each rotation of this axle, or once for each 8 reciprocations of the plunger. Tripping of this lever arm 94 will release the coil spring 96 which abuts on the fixed collar 95 at its outer end. This spring will then drive the slidable gear wheel 33 away from the fixed collar and out of engagement with gear wheel 32. No further knots will be tied until the lever 97 shown at the upper left of Figure 2, encounters one of the heavy crosswires above the hops. During the period immediately following the tying of the 8th knot, the plunger will remain idle within the housing 63, leaving the slot 67 free so that the light wire may be moved up and out of the slot by rods 117 as the machine passes under the heavy cross wire, and then returned to it immediately thereafter. The lever 97 is pivotally mounted at the top of one of the uprights 25 and attached to the cable 98 which is quite flexible but does not stretch materially under tension. When the lever 97 is pushed downward by the crosswire, a pull is exerted on the cable, thus tripping the catches 99 and 100, shown in Fig. 12. These catches are pivoted to a support 101 on the base frame and normally hook over projections 102 and 103 respectively on lever arm 104 which is in turn pivotally mounted on slidable arm 105. The upper end of the lever arm 104 comprises a yoke 106 having slots 107 in each arm. These slots receive pins 108 projecting from the collar 109 which encircles the bushing 110 on axle 34, and when the catches are in place this lever serves to retain the spring 111 away from the gear wheel 33. When these catches are tripped, the spring 111, which is stronger than spring 96, forces the gear wheel 33 back into engagement with gear 32, and catch 94 which has a beveled end, is forced over the flange 118 on gear 33. The catch is held in position on the flange by compression spring 119. A spring 112 between the lower part of the lever arm 104 and the support 101 serves to pull this portion of the lever and the slidable arm on which it is pivoted back into position, and the lower catch 100 will then slip over the protuberance 103. The lever arm is then in a diagonal position and will shortly thereafter be engaged by the cam 113 fixed to the axle 22. This cam will force the lower end of the lever inward so that it will pivot about 95 thus forcing its upper end outward, and compressing the spring 111 against abutment collar 120. When this motion has continued to the proper point, catch 99 will drop over protuberance 102, and the entire clutch engaging mechanism will again be locked until released by contact of the lever 97 with another crosswire. Compression springs 114 and 115 mounted between the support 101 and the cable ends of the catches to force them down into position over the protuberances 102 and 103. It will occasionally happen that the cam 113 will be in cocking position at the very time the machine is passing under a crosswire, and tension is exerted on the cable. In this case the spring 111 will be released regardless of the cam action, since the lower catch releases the support 105 on which the lever arm is pivoted. Since the cam will rotate completely 4 times during the time the gears should be in engagement, there will be no danger of the cocking action failing to operate before an engaging action is next needed.

Immediately over the clove hitch section of the housing 63 are two arcuate rods 116 which serve to lift the heavy crosswires to clear the machine as these are encountered. A short distance in front of these rods is a hinged guide member 117 which is so attached to the frame that upon encountering a heavy wire it will be forced downward but will be returned to a vertical position immediately after passage of the wire by a biasing spring. Either this guide member or the slot in the clove knotter will be in engagement with the light wire at all times, so there is no danger that the machine will lose the wire while passing through intersections.

Suitable manual controls may be connected to the guide member 117 and the clutch mechanism in order that these may be manually operated in case of emergencies. The uprights 25 and diagonals 26 may be telescopic so that the height of the machine can be adjusted. The clove knot tyer may be made in two hinged sections biased together with suitable springs in order to receive wires having a diameter too large to be accommodated by the channel.

It will be appreciated that my device as described includes a number of mechanical features which are well known, and for which mechanical equivalents may be substituted without affecting the essential mode of operation of the machine. For instance, the passages in the housing 63 may be lined with various conventional materials designed to facilitate reciprocation of the plunger, or with bearings of various types. The housing may be made in several parts for ease of manufacture and these parts may be machined or cast by various processes. Other clutch mechanisms may be adopted and the gear ratios adjusted to different systems of proportioning the overhead wires to the number of hop plants between wires. The size of the measuring wheel may be adapted to the length of twine desired under any given circumstances.

While it is simple and quick to release the twine from the plunger by severing it, other releasing mechanisms may be provided for the plunger head. The plunger may be made of woven wire or any suitable material or combination of materials which meets the requirements of durability, flexibility, and relative incompressibility. Other methods of delivering the twine to the plunger head in measured lengths may be adopted, and the passages in the housing may be so formed as to tie other knots.

What I claim is as follows:

1. A device for tying a knot in a cord comprising housing and passageways therein which follow the outline of the knot to be tied, a knot receiving cavity in said housing, slots having a diameter less than that of the passageways and connecting said passageways to said cavity, a flexible plunger having a diameter greater than that of said slots adapted to pass through said passageways, cord gripping means on one end of said plunger, and means for drawing said plunger through said channels.

2. A device as claimed in claim 1 in which said cavity is adapted to receive and travel along a wire and said passageways are so disposed that the cord carrying plunger encircles the wire in the course of its travel.

3. A device as claimed in claim 1 in which said cord gripping means comprises a hook and cooperating pivoted blade adapted to cut said cord when said blade is forced against said hook.

4. A device as claimed in claim 3 in which said passageway narrows near one end to force said blade against said hook.

5. A device as claimed in claim 1 in which said passageway has a narrowed portion and said cord gripping means is adapted to release said cord when it encounters said narrowed portion.

6. A device for affixing twines to overhead wires comprising a vehicle, a source of twine on said vehicle, a knot tying device mounted on said vehicle and adapted to travel along said wire and means for supplying twine from said source to said knot tyer.

7. A device as claimed in claim 6 in which said knot tyer includes a flexible plunger terminating in a cord pick up, said plunger being reciprocated in said knot tyer at a speed determined by the speed of the vehicle.

8. A device as claimed in claim 7 in which a plurality of twine lengths are passed over a rotating wheel, and each twine length is presented in turn in a position to be picked up by said plunger.

9. A device as claimed in claim 8 in which said wheel carries a plurality of cord severing devices, one associated with each twine and adapted to sever that twine after it has been picked up by said plunger.

10. A device as claimed in claim 9 including a clutch adapted to disengage the driving means for said plunger after a predetermined number of knots have been tied.

11. A device as claimed in claim 10 including means for re-engaging said clutch when a wire is mounted running perpendicular to the wire about which the knots are tied.

12. A device as claimed in claim 1 in which the passageway is in the shape of an overhand knot.

13. A device as claimed in claim 1 in which the passageway is in the shape of a clove hitch.

14. A device as claimed in claim 1 in which the passageway is in the form of an overhand knot and a clove hitch.

15. A device as claimed in claim 14 in which said plunger picks up the cord at a point intermediate its ends, draws it first through the overhand knot portion of the housing to form an overhand knot and then through the clove hitch portion to form a double clove hitch in the loop portion of the overhand knot.

16. A device as claimed in claim 6 in which said knot tyer includes a flexible plunger terminating on a cord pick up, a plurality of cords are passed over a rotating measuring wheel, each cord is presented in turn as a position to be picked up by said cord pick-up on said plunger, and said plunger is reciprocated as many times during each turn of the measuring wheel as there are separate cords on the wheel.

HIRAM PRICE WILSON.

REFERENCES CITED

The following references are of record in the file of this patent:

UNITED STATES PATENTS

| Number | Name | Date |
| --- | --- | --- |
| 283,516 | Root | Aug. 21, 1883 |
| 306,691 | Johnson | Oct. 14, 1884 |
| 316,165 | Mulligan | Apr. 21, 1885 |
| 376,515 | Corey | Jan. 17, 1888 |
| 697,750 | Pridmore | Apr. 15, 1902 |
| 1,227,716 | Wenzel | May 29, 1917 |
| 1,424,458 | Fleisher | Aug. 1, 1922 |
| 1,534,441 | Coveleskie | Apr. 21, 1925 |
| 1,978,103 | Croasdale, Jr., et al. | Oct. 23, 1934 |